May 24, 1932.                J. W. LACY                1,860,188
                        BRAKING SYSTEM AND VALVE
                          Filed Nov. 2, 1929
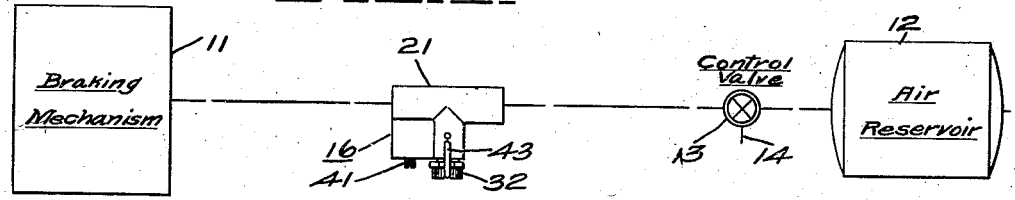
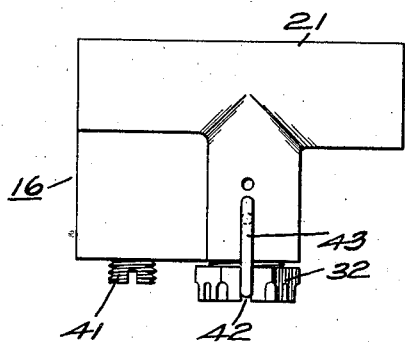
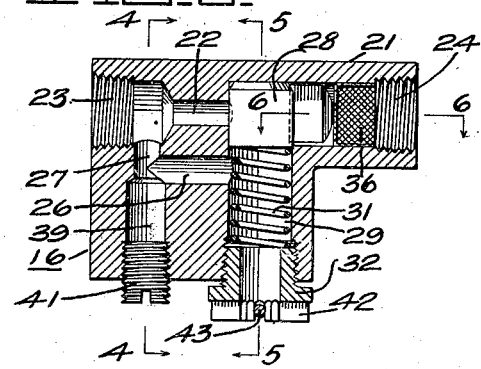
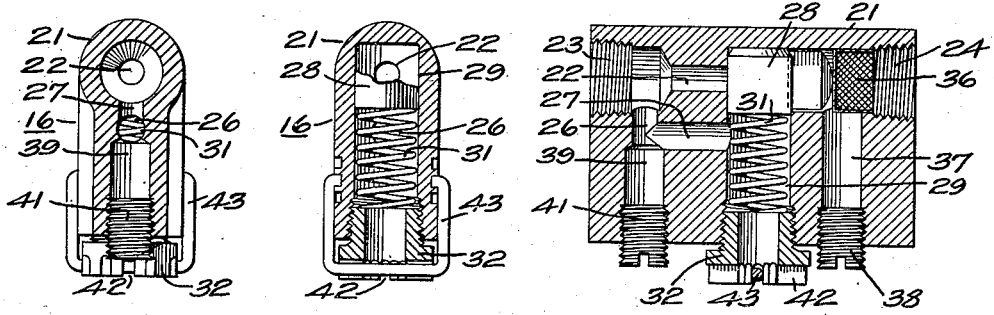
INVENTOR:
Joseph W. Lacy
BY White, Prost, Hehr & Lothrop
ATTORNEYS.

Patented May 24, 1932

1,860,188

UNITED STATES PATENT OFFICE

JOSEPH W. LACY, OF CHESTER, CALIFORNIA

BRAKING SYSTEM AND VALVE

Application filed November 2, 1929. Serial No. 404,429.

My invention relates to a system which is useful for decelerating a moving body such as a train. My invention also contemplates the provision of a valve structure which is useful with the braking system of my invention. Since the valve and the braking system have been utilized successfully in connection with railway practice on trains I shall describe them in this environment.

Present day railway practice with respect to the deceleration of the train includes the provision of two braking systems which are respectively termed "automatic air" and "straight air." With automatic air, an application of the brakes is made upon each vehicle comprising the train upon a reduction in pressure in the brakeline which connects the several braking mechanisms. The reduction is made by opening a valve in the engineer's cab. The motive force for the application of the brakes is supplied from a main reservoir usually carried upon the locomotive. This reservoir serves, in combination with a valve termed a triple valve, to supply air for application of brakes, for their release and to maintain a pressure in an auxiliary air reservoir provided upon each of the vehicles. The triple valve is a relatively complex mechanism which controls the passage of air from the auxiliary reservoir to the braking mechanism. This valve, like any other piece of mechanism is apt to be in bad repair and defective. Under some conditions it happens that the air pressure cannot be maintained or cannot be so applied as to permit of the control of the train. These conditions have given rise to serious accidents.

Straight air calls for an application directly from the main air reservoir on the locomotive to each of the individual braking mechanisms throughout the train. When it is desired to release the brakes the system, including the brake pipe extending throughout the train, must be entirely vented through the valve in the engineer's cab. This requires a considerable length of time for execution and a consequent delay in handling.

It is therefore an object of my invention to provide a braking system which will enable an application of straight air to be utilized for the braking of a train without the necessity of venting the system only at the cab.

The invention possesses other advantageous features, some of which with the foregoing will be set forth at length in the following description where I shall outline in full that form of braking system and valve of my invention, which I have selected for illustration in the drawings accompanying and forming part of the present specification. In said drawings I have shown one form of the braking system and valve embodying my invention, but it is to be understood that I do not limit myself to such form since the invention, as set forth in the claims, may be embodied in a plurality of forms.

In the drawings, to which reference has been made, Figure 1 is a diagrammatic representation of a braking system.

Figure 2 is a side elevation of a valve employed with my braking system.

Figure 3 is a view in transverse section of the valve shown in Figure 2.

Figure 4 is a cross section through the valve shown in Figure 3 along the line 4—4 thereof.

Figure 5 is a cross section through the device shown in Figure 3 along the line 5—5.

Figure 6 is a cross section through the valve shown in Figure 3 along the line 6—6.

Figure 7 is the transverse section through another form of valve.

Briefly characterized my invention comprises a braking system in which an application of air is made directly from the main reservoir in the engineer's cab to each of the braking mechanisms upon the vehicles comprising the train. The system is so provided that the venting is accomplished individually on each of the cars, thus obviating the necessity of venting the entire system through the engineer's valve.

My invention also contemplates the provision of a valve structure which is useful in accomplishing the braking of a train by means of straight air, the braking being effected by the application of various air pressures corresponding to the degree of deceleration desired.

In that form of the invention which I have disclosed in Figure 1 there is provided a braking mechanism 11 adapted to be applied to decelerate the train upon admission of the air from air reservoir 12 through control valve 13. The control valve is provided with an atmospheric vent 14 so that air supplied to the braking mechanism may be vented directly to the atmosphere at this point to reduce the pressure. A system operating substantially along these lines is practically identical with the usual straight air system.

In accordance with my invention I have provided a valve means, indicated generally at 16, which enables an almost immediate reduction to be made upon each one of the brake mechanisms included in the train so that the deceleration effect may be quickly stopped if desired.

In the form of valve which I have chosen to disclose here, a body 21 is formed with a centrally positioned passageway 22. In communication with this central passageway and formed with screw threads to receive suitable pipe connections are openings 23 and 24 respectively provided upon the outlet and inlet side of the body. The openings and the central pasasge way furnish a fluid passage directly thru the body, which is a continuance of the fluid passage through a straight air pipe.

The opening 23 is in communication with a passage 26 through a conduit 27. The passage 26 and the central passage way 22 are so disposed in the body that a piston 28 which is movable in a cylinder 29 can obstruct and shut off the flow of air through the passage 26 or the central passageway 22. The piston is preferably of such extent that but one of these fluid passages is obstructed by the piston at any one time. The piston is biased, for reasons which will presently appear, by a spring 31, the tension of which is adjusted by means of adjusting nut 32. It is to be noted that the adjusting nut 32 is hollow so that fluid passing through the passage way 26 may pass out through the unobstructed portion of the cylinder to the atmosphere.

In operation, upon an application of air through the control valve to the braking mechanism, the piston 28 moves downwardly against the bias of the spring 31 to close the passage 26 and to allow the air to pass through the central passage way 22 on to the braking mechanism. The air pressure from the reservoir upon one side of the piston, being in excess of the atmospheric pressure upon the other side, maintains it in a position wherein the passage 26 is cut off from communication with the atmosphere. When it is desired to release the braking mechanism the control valve is vented through vent 14. This serves to reduce the pressure in the line up to the piston 28 which then moves to close the central passageway 22 and to open the passage 26 so that the air may pass directly through the hollow nut 32 to the atmosphere. In this manner the release of air upon the braking mechanism is facilitated in such a manner that operations similar to those possible with automatic air are had.

I have found it desirable to provide for the collection and removal of moisture and sediment which may find its way to the system. To care for the sediment I preferably provide a screen 36 in the inlet opening 24 so that air admitted to the valve is strained. To care for any moisture which may be present in the air at this point I have preferably formed the valve body with a chamber 37, as is best shown in Figure 7, which is so positioned as to receive moisture finding its way past the screen. A screw 38 serves to close the chamber in such a fashion that removal of any sediment or moisture may be readily made. Somewhat similar protection is afforded the braking mechanism side of the valve through the provision of space 39 in communication with the opening 23 through the conduit 27. This opening likewise is closed by a screw 41 so that ready removal may be had of sediment and moisture.

In practice, the valve may be set to operate under different pressure differentials. This is readily accomplished by adjusting the tension of the spring 31 by means of the nut 32. When the piston and spring have been positioned it is desirable that the nut be adequately secured in place. To accomplish this I have preferably formed the nut with castellations 42 in which a spring clip 43 is received to lock the nut relative to the body. If desired a more substantial form of lock may be employed so that changing of the valve may only be made by an authorized person.

I claim:

A brake valve comprising a valve body having a bore therein, a solid piston reciprocable in said bore between a first position and a second position, a plug seated in one end of said bore to form an abutment, said plug having a passage therethrough to establish communication between said bore and the atmosphere, and a spring abutting said plug and said piston for urging said piston towards said first position, said body having a first passage extending entirely therethrough and intersecting said bore in a location such that said first passage is blocked by said piston in said first position, and said body having a second passage communicating with said first passage and intersecting said bore in a location such that said second passage is blocked by said piston in said second position but establishes communication with the atmosphere through said plug when said piston is in said first position.

In testimony whereof, I have hereunto set my hand.

JOSEPH W. LACY.